(12) United States Patent
Lee et al.

(10) Patent No.: US 9,875,849 B2
(45) Date of Patent: Jan. 23, 2018

(54) MULTILAYER CERAMIC ELECTRONIC COMPONENT AND MANUFACTURING METHOD THEREOF

(71) Applicant: SAMSUNG ELECTRO-MECHANICS CO., LTD., Suwon-si, Gyeonggi-do (KR)

(72) Inventors: Jin Woo Lee, Suwon-si (KR); Bong Jun Juhng, Suwon-si (KR); Duk Hyun Chun, Suwon-si (KR); Won Pyo Lee, Suwon-si (KR); Seung Hee Yoo, Suwon-si (KR); Myung Jun Park, Suwon-si (KR)

(73) Assignee: SAMSUNG ELECTRO-MECHANICS CO., LTD., Suwon-si, Gyeonggi-do ( * ) Notice: Subject to any disclaimer, the term of this patent is extended or adjusted under 35 U.S.C. 154(b) by 58 days.

(21) Appl. No.: 14/990,742

(22) Filed: Jan. 7, 2016

(65) Prior Publication Data

US 2016/0351332 A1 Dec. 1, 2016

(30) Foreign Application Priority Data

May 29, 2015 (KR) ........................ 10-2015-0075872

(51) Int. Cl.
*H01G 4/30* (2006.01)
*H01G 4/232* (2006.01)
*H01G 13/00* (2013.01)
*H01G 4/12* (2006.01)

(52) U.S. Cl.
CPC ............... *H01G 4/30* (2013.01); *H01G 4/232* (2013.01); *H01G 4/12* (2013.01); *H01G 13/006* (2013.01)

(58) Field of Classification Search
CPC .......... H01G 4/30; H01G 4/005; H01G 4/232; H01G 4/12; H01G 4/012
See application file for complete search history.

(56) References Cited

U.S. PATENT DOCUMENTS 8,498,095 B2 * 7/2013 Yano ...................... H01G 4/005
361/303
2002/0041006 A1 * 4/2002 Ahiko .................... H01G 4/012
257/532
2005/0088803 A1 4/2005 Umeda et al.
(Continued)

FOREIGN PATENT DOCUMENTS

DE  10 2012023720  *  6/2014
JP  2003-077726 A  3/2003
(Continued)

*Primary Examiner* — Nguyen Ha
(74) *Attorney, Agent, or Firm* — McDermott Will & Emery LLP (57) ABSTRACT

A multilayer ceramic electronic component includes: a main body; and a first external electrode disposed on a first surface of the main body and a second external electrode disposed on a second surface of the main body. The first external electrodes include a first base electrode forming an edge portion of the first surface of the main body and a first terminal electrode disposed on a portion of the first base electrode. The second external electrodes include a second base electrode forming an edge portion of the second surface of the main body and a second terminal electrode disposed on a portion of the second base electrode.

13 Claims, 6 Drawing Sheets (56) References Cited

U.S. PATENT DOCUMENTS

| | | | |
|---|---|---|---|
| 2013/0220696 A1* | 8/2013 | Otani | H01G 4/12 174/534 |
| 2013/0250472 A1 | 9/2013 | Lee | |
| 2013/0329389 A1* | 12/2013 | Hattori | H05K 1/0216 361/782 |
| 2014/0347783 A1* | 11/2014 | Kisumi | H01B 1/22 361/301.4 |

FOREIGN PATENT DOCUMENTS

| | | |
|---|---|---|
| JP | 2004-260029 A | 9/2004 |
| JP | 2005-129802 A | 5/2005 |
| KR | 10-2009-0117686 A | 11/2009 |
| KR | 10-2013-0104361 A | 9/2013 |

\* cited by examiner

MULTILAYER CERAMIC ELECTRONIC COMPONENT AND MANUFACTURING METHOD THEREOF

CROSS-REFERENCE TO RELATED APPLICATION

This application claims the benefit of priority to Korean Patent Application No. 10-2015-0075872 filed on May 29, 2015, with the Korean Intellectual Property Office, the disclosure of which is incorporated herein by reference.

TECHNICAL FIELD

The present disclosure relates to a multilayer ceramic electronic component and a manufacturing method thereof.

BACKGROUND

Electronic components using ceramic materials include capacitors, inductors, piezoelectric elements, varistors, thermistors, and the like.

A multilayer ceramic capacitor (MLCC), as a ceramic electronic component, may have advantages such as small size, high capacitance, and ease of mountability.

The multilayer ceramic capacitor may be used as a chip type condenser mounted on printed circuit boards of several electronic products such as display devices including liquid crystal displays (LCDs), plasma display panels (PDPs), and the like, computers, personal digital assistants (PDAs), and mobile phones, and the like, and may charge and discharge electricity.

The multilayer ceramic capacitor may suppress voltage noise in a circuit. When the multilayer ceramic capacitor is used in a high frequency environment, the multilayer ceramic capacitor may have high equivalent series inductance (hereinafter, referred to as 'ESL'), and there is a need to secure a predetermined level or less of equivalent series resistance (hereinafter, referred to as 'ESR') to promote stability.

In addition, the size of multilayer ceramic capacitors have been getting smaller and higher capacitance have been implemented therein, and the amounts of stacked dielectric layers and internal electrodes disposed therein have also been increased in order to realize high degrees of capacitance. In this case, since multilayer ceramic capacitors have been miniaturized and thicknesses thereof have been increased, it may be difficult to stably mount such multilayer ceramic capacitors on the printed circuit boards. That is, a mounting defect rate of the multilayer ceramic capacitor may increase.

As described above, there is a need to variously adjust the ESL and the ESR in the multilayer ceramic electronic component.

In a related art, adjusting ESR and ESL for a multilayer capacitor has been disclosed, and a multilayer ceramic condenser has been miniaturized in terms of size and implemented with high capacitance. However, there still exists a need for solving a problem when mounting a multilayer ceramic condenser on a printed circuit board.

SUMMARY

An aspect of the present inventive concept provides a multilayer ceramic electronic component having improved mounting stability, equivalent series resistance (ESR) characteristics, reliability, and moisture resistance, and a manufacturing method thereof.

According to an exemplary embodiment in the present disclosure, a multilayer ceramic electronic component includes: a main body in which dielectric layers and first and second internal electrodes are stacked in a thickness direction of the main body; and a first external electrode disposed on a first surface of the main body and a second external electrode disposed on a second surface of the main body. The first internal electrodes are exposed to the first surface of the main body and connected to the first external electrode, the second internal electrodes are exposed to the second surface of the main body and connected to the second external electrode. The first external electrodes include a first base electrode forming a first edge portion of the first surface of the main body and a first terminal electrode disposed on a portion of the first base electrode, and the second external electrodes include a second base electrode forming an edge portion of the second surface of the main body and a second terminal electrode disposed on a portion of the second base electrode.

When a thickness of the first or second base electrode from a center of the first or second surface of the main body to a center of the first or second base electrode in a length direction of the body is defined as A, and a thickness of the first or second external electrode from the first or second surface of the main body to the most outer surface of the first or second terminal electrode is defined as A', A'/A may satisfy $0.7 \leq A'/A \leq 1.2$.

The first base electrode may extend from the first surface of the main body toward the second surface of the main body in a length direction of the body to be in contact with third, fourth, fifth, or sixth surface of the main body from the first surface of the main body. The first terminal electrode may extend in the length direction of the body to be disposed on the extended portion of the first base electrode. The second base electrode may extend from the second surface of the main body toward the first surface of the main body in the length direction of the body to be in contact with the third, fourth, fifth, or sixth surface of the main body. The second terminal electrode may extend in the length direction of the body to be disposed on the extended portion of the second base electrode. When a length from the first or second surface of the main body to the extended portion of the first or second base electrode, which extends from the first or second surface of the main body to the third, fourth, fifth, or sixth surface thereof, is defined as B, and a length from the first or second surface of the main body to the extended portion of the first or second terminal electrode, which extends from the first or second surface of the main body to the third, fourth, fifth, or sixth surface thereof in the length direction of the body, is defined as B', B'/B may satisfy $0.8 \leq B'/B \leq 1$. When viewing from the first or second surface of the main body in a thickness-width direction of the body, an area of the first or second surface of the main body is defined as C, and an area of the first or second terminal electrode disposed on the first or second surface of the main body is defined as C', C'/C may satisfy $0.4 \leq C'/C \leq 0.7$.

According to another exemplary embodiment in the present disclosure, a manufacturing method of a multilayer ceramic electronic component may include: preparing ceramic green sheets; printing a first conductive paste on at least one surface of the ceramic green sheets to form first and second internal electrode patterns on the ceramic green sheets; stacking and sintering the ceramic green sheets, on which the first and second internal electrode patterns are formed, to form a main body which comprises dielectric layers, and first and second internal electrodes; and applying a second conductive paste on a first surface of the main body on a first surface of the main body to form a first external electrode so that the first external electrode is electrically connected to the first internal electrodes and applying a third conductive paste on a second surface of the main body to form a second external electrode on a second surface of the main body so that the second external electrode is electrically connected to the second internal electrodes. The step of applying the second conductive paste includes forming a first base electrode and forming a first terminal electrode on a portion of the first base electrode to form an edge portion of the first surface of the main body. The step of applying the third conductive paste includes forming a second base electrode and forming a second terminal electrode on a portion of the second base electrode to form an edge portion of the second surface of the main body.

BRIEF DESCRIPTION OF THE DRAWINGS

The above and other aspects, features, and advantages of the present disclosure will be more clearly understood from the following detailed description taken in conjunction with the accompanying drawings.

DETAILED DESCRIPTION

Hereinafter, embodiments of the present inventive concept will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein is for describing particular embodiments only and is not intended to be limiting of the present inventive concept. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present inventive concept will be described with reference to schematic views illustrating embodiments of the present inventive concept. In the drawings, for example, due to manufacturing techniques and/or tolerances, modifications of the shape shown may be estimated. Thus, embodiments of the present inventive concept should not be construed as being limited to the particular shapes of regions shown herein, for example, to include a change in shape results in manufacturing. The following embodiments may also be constituted by one or a combination thereof.

The contents of the present inventive concept described below may have a variety of configurations and propose only a required configuration herein, but are not limited thereto.

In addition, prior to descriptions, directions in the present disclosure will be defined. L, W, and T directions, illustrated in FIG. 1, refer to a length direction, a width direction, and a thickness direction, respectively.

Figure 1:
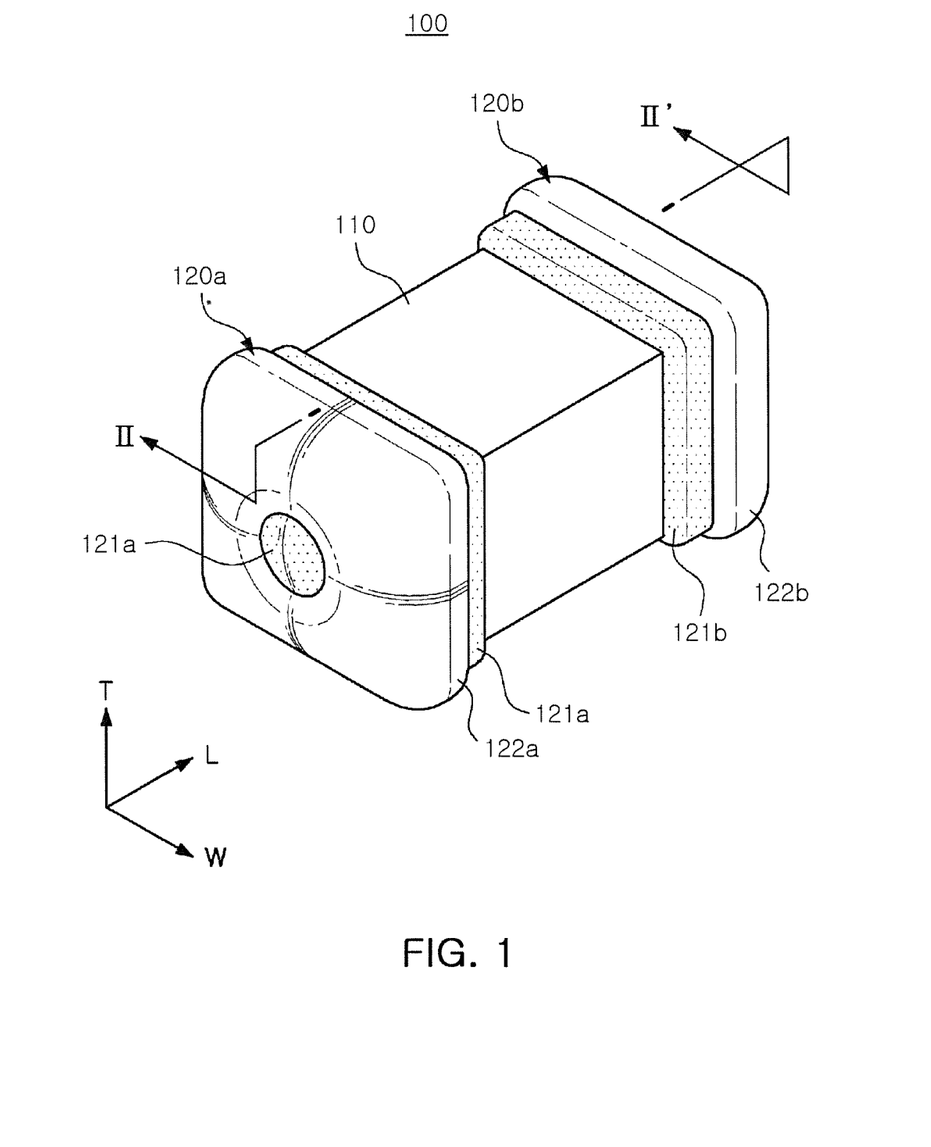
FIG. 1 is a perspective view of a multilayer ceramic electronic component according to an exemplary embodiment in the present disclosure.
Figure 2:
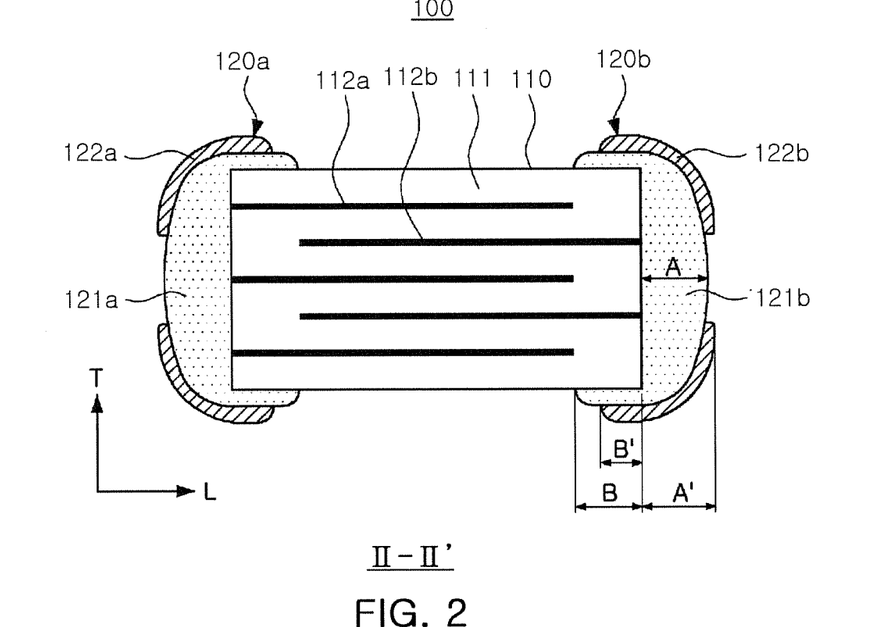
FIG. 2 is a cross-sectional view taken along line II-II' of FIG. 1.
Figure 3:
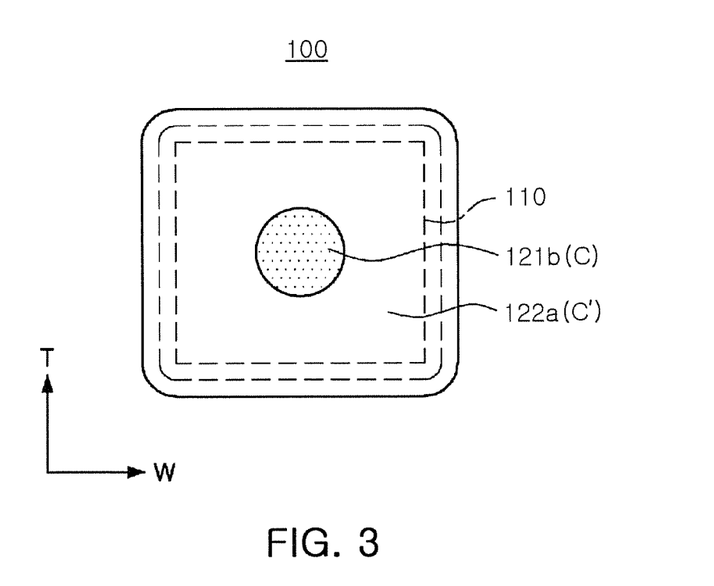
FIG. 3 is a view of the multilayer ceramic electronic component in a T-W direction of FIG. 1.

FIG. 1 is a perspective view of a multilayer ceramic electronic component 100 according to an exemplary embodiment in the present disclosure, FIG. 2 is a cross-sectional view taken along line II-II' of FIG. 1, and FIG. 3 is a view of the multilayer ceramic electronic component in a T-W direction of FIG. 1. In FIG. 3, in order to illustrate a main body 110, base electrodes and terminal electrodes are transparent.

Referring to FIGS. 1 through 3, the multilayer ceramic electronic component 100 may include the main body 110 in which dielectric layers 111, and first and second internal electrodes 112a and 112b are stacked. A first external electrode 120a is disposed on a first surface of the main body 110, and a second external electrode 120b is disposed on a second surface of the main body 110. The first internal electrodes 112a may be exposed to the first surface of the main body 110 to thereby be connected to the first external electrode 120a, and the second internal electrodes 112b may be exposed to the second surface of the main body 110 to thereby be connected to the second external electrode 120b. The first external electrode 120a may include a first base electrode 121a and a first terminal electrode 122a disposed on a portion of the first base electrode 121a forming an edge portion of the first surface of the main body 110. The second external electrode 120b may include a second base electrode 121b and a second terminal electrode 122b disposed on a portion of the second base electrode 121b forming an edge portion of the second surface of the main body 110.

The dielectric layer 111 may contain a ceramic material having high permittivity such as a barium titanate ($BaTiO_3$)-based ceramic powder, or the like. However, the material of the dielectric layer 111 is not limited thereto as long as sufficient capacitance may be obtained therefrom. In addition, the dielectric layer ill may further contain various ceramic additives such as transition metal oxides or carbides, a rare earth element, magnesium (Mg), aluminum (Al), or the like, an organic solvent, a plasticizer, a binder, a dispersant, and the like, in addition to the ceramic powder, as required.

The first and second internal electrodes 112a and 112b, electrodes having different polarities from each other, may be spaced apart from each other with respective dielectric layers 111 interposed therebetween.

The first and second internal electrodes 112a and 112b may include a conductive metal, for example, at least one of silver (Ag), lead (Pb), platinum (Pt), nickel (Ni), and copper (Cu), alloys thereof, or the like. However, a material of the first and second internal electrodes 112a and 112b is not limited thereto.

The first and second internal electrodes 112a and 112b may be disposed in the main body 110 to overlap each other with respective dielectric layers 111 interposed therebetween. Further, the first and second internal electrodes 112a and 112b may be exposed to at least one surface of the main body 110 to thereby be electrically connected to the first and second external electrodes 120a and 120b, respectively, and to have electrical charges having opposing polarities applied thereto by the first and second external electrodes 120a and 120b. In this case, capacitance may be formed by portions of the first and second internal electrodes 112a and 112b overlapping each other.

The first and second external electrodes 120a and 120b may be formed on both end surfaces of the main body 110 in the length direction to cover the first and second internal electrodes 112a and 112b exposed to both end surfaces of the main body 110 in the length direction to thereby be electrically connected to the first and second internal electrodes 112a and 112b, respectively.

The first and second external electrodes 120a and 120b as described above may have a plurality of layers. Referring to FIG. 2, the first external electrode 120a may include the first base electrode 121a and the first terminal electrode 122a, and the second external electrode 120b may include the second base electrode 121b and the second terminal electrode 122b. The first and second base electrodes 121a and 121b may include a conductive metal, for example, at least one of silver (Ag), lead (Pb), platinum (Pt), nickel (Ni), and copper (Cu), alloys thereof, or the like. However, the material of the first and second base electrodes 121a and 121b is not limited thereto.

The first and second terminal electrodes 122a and 122b may be disposed on the first and second base electrodes 121a and 121b, respectively, and contain a conductive material. In this case, the first and second terminal electrodes 122a and 122b may contain a resin and the conductive material in order to have a stable shape and decrease impacts generated at the time of mounting the multilayer ceramic electronic component. As the conductive material, one of silver (Ag), lead (Pb), platinum (Pt), nickel (Ni), and copper (Cu), alloys thereof, or the like, may be used, but the conductive material is not limited thereto. The resin may be a thermosetting resin including an epoxy, but is not limited thereto.

Referring to FIG. 1, the first terminal electrode 122a may not be disposed in a central portion of the first base electrode 121a disposed on the first surface of the main body 110, and the second terminal electrode 122b may not be disposed in a central portion of the second base electrode 121b disposed on the second surface of the main body 110.

That is, convex shapes of the first and second base electrodes 121a and 121b may be alleviated by the first and second terminal electrodes 122a and 122b.

In the multilayer ceramic electronic component 100 according to the exemplary embodiment, the main body 110 may have a rectangular parallelepiped shape having the first to sixth surfaces. Here, a surface of the main body 110 on which the first external electrode 120a is disposed may be the first surface thereof, a surface of the main body 110 on which the second external electrode 120b is disposed may be the second surface thereof, and surfaces of the main body 110 perpendicular to the first and second surfaces may be the third to sixth surfaces thereof.

Referring to FIG. 1, the first and second surfaces of the main body 110 may oppose each other in the length (L) direction, the third surface may be a lower surface of the main body 110, the fourth surface may be an upper surface of the main body 110, and the fifth and sixth surfaces may be surfaces of the main body 110 opposing each other in the width (W) direction. However, the multilayer ceramic electronic component 100 is not limited to the exemplary embodiment of FIG. 1.

In FIG. 1, the first base electrode 121a may enclose edges of the main body 110 between the first surface of the main body 110 and the third, fourth, fifth, and sixth surfaces thereof, and the second base electrode 121b may enclose edges of the main body 110 between the second surface of the main body and the third, fourth, fifth, and sixth surfaces thereof. The first terminal electrode 122a may be disposed on a portion of the first base electrode 121a which encloses the edges of the main body 110 between the first surface of the main body 110 and the third, fourth, fifth, and sixth surfaces thereof. The second terminal electrode 122b may be disposed on a portion of the second base electrode 121b which encloses the edges of the main body 110 between the second surface of the main body and the third, fourth, fifth, and sixth surfaces thereof.

Referring to FIG. 3, the first and second terminal electrodes 122a and 122b may not be formed on central portions of the first and second surfaces of the main body 110. Therefore, the first and second terminal electrodes 122a and 122b may be toroidal.

In addition, portions of the first and second base electrodes 121a and 121b exposed to the first or second surface of the main body 110 may be thicker than portions of the first and second base electrodes 121a and 121b covered by the first or second terminal electrode 122a or 122b.

Referring to FIG. 2, the first and second base electrodes 121a and 121b may have a convex shape in the central portions of the first and second surfaces of the main body 110. In this case, when a thickness of the first or second base electrode 121a or 121b in the center of the first or second surface of the main body 110 is defined as A, and a thickness of the first base electrode 121a and the first terminal electrode 122a or a thickness of the second base electrode 121b and the second terminal electrode 122b at an end portion of the first or second terminal electrode 122a or 122b disposed on the first or second surface of the main body 110 is defined as A', A'/A may satisfy $0.7 \leq A'/A \leq 1.2$.

That is, a ratio of a sum of thicknesses of the first base electrode 121a and the first terminal electrode 122a or a sum of thicknesses of the second base electrode 121b and the second terminal electrode 122b at the end portion of the first or second terminal electrode 122a or 122b disposed on the first or second surface of the main body 110 to the thickness of the first or second base electrode 121a or 121b in the center of the first or second surface of the main body 110 may be 0.7 to 1.2.

When A'/A is less than 0.7 or greater than 1.2, the convex shapes of the first and second external electrodes may not be sufficiently alleviated by the first and second terminal electrodes, and thus a mounting defect may occur. Further, in a case in which A'/A is greater than 1.2, portions of the first and second external electrodes in which the first and second terminal electrodes are formed may have a thick thickness, and thus central portions of the first and second external electrodes may become concave, and thus, exterior defects may occur.

Referring to FIG. 2, the first base electrode 121a may extend to be disposed on the third, fourth, fifth, or sixth surface of the main body 110 from the first surface of the main body 110, and the first terminal electrode 122a may extend to be disposed on the first base electrode 121a which extends to be disposed on the third, fourth, fifth, or sixth surface of the main body 110. Further, the second base electrode 121b may extend to be disposed on the third, fourth, fifth, or sixth surface of the main body 110 from the second surface of the main body 110, and the second terminal electrode 122b may extend to be disposed on the second base electrode 121b which extends to be disposed on the third, fourth, fifth, or sixth surface of the main body 110.

When a length from the first or second surface of the main body 110 to a portion of the first or second base electrode 121a or 121b, which extends from the first or second surface of the main body 110, to the third, fourth, fifth, or sixth surface thereof is defined as B, and a length from the first or second surface of the main body 110 to a portion of the first or second terminal electrode 122a or 122b, which extends from the first or second surface of the main body 110, to the third, fourth, fifth, or sixth surface thereof is defined as B', B'/B may satisfy $0.8 \leq B'/B \leq 1$.

That is, a ratio of a length of the portion of the first or second terminal electrode 122a or 122b, which extends to the third or fourth surface of the main body 110, to a length of the portion of the first or second base electrode 121a or 121b, which extends to the third or fourth surface of the main body 110, may be 0.8 to 1.

In a case in which the multilayer ceramic capacitor 100, which has the first and second external electrodes 120a and 120b extending to be disposed on the third to sixth surfaces of the main body 110 as described above, is mounted on or embedded in a printed circuit board, the multilayer ceramic electronic component 100 and the printed circuit board may be adhered to each other by an adhesive material such as solder or the like between the first and second external electrodes 120a and 120b of the multilayer ceramic electronic component 100 and electrodes of the printed circuit board. At the time of adhesion as described above, the first and second external electrodes 120a and 120b may be applied with stress, and the stress may be partially transferred to an interior of the main body 110.

When B' is smaller than B, the first base electrode, the first terminal electrode, the second base electrode, and the second terminal electrode may be adhered to the electrodes of the printed circuit board by the adhesive material such as the solder or the like. Since a composition of the first and second base electrodes may be different from that of the first and second terminal electrodes, a level of stress applied to the first and second base electrodes and a level of stress applied to the first and second terminal electrodes may be different, and the amount of stress transferred to the interior of the main body by the first and second base electrodes may be greater than stress transferred to the interior of the main body by the first and second terminal electrodes. If B'/B is less than 0.8, when the multilayer ceramic electronic component is mounted or embedded, cracks may occur in the main body due to the above-mentioned stress behavior.

When B'/B is greater than 1, the first and second terminal electrodes may be adhered to the third to sixth surfaces of the main body. Since the first and second terminal electrodes may contain a resin, adhesion to the main body may not be stable. Therefore, a problem, in which the first and second terminal electrodes adhered to the main body are delaminated, may occur.

Referring to FIG. 3, when the main body 110 is viewed from the first or second surface of the main body 110, an area of the first or second surface of the main body 110 is defined as C, and an area of the first or second terminal electrode 122a or 122b disposed on the first or second surface of the main body 110 is defined as C', C'/C may satisfy $0.4 \leq C'/C \leq 0.7$.

That is, in the first base electrode 121a, the second base electrode 121b, the first terminal electrode 122a, and the second terminal electrode 122b formed on the first or second surface of the main body 110, a ratio of an area of an unexposed portion of the first or second base electrode 121a or 121b to the area of the first or second surface of the main body 110 may be 0.4 to 0.7.

In a case in which C'/C is less than 0.4, the area of the first and second terminal electrodes formed on the first and second surfaces of the main body is not sufficient, and thus, reliability and moisture resistance may be deteriorated due to infiltration of a plating solution, transfer of external impacts, or the like. When C'/C is greater than 0.7, since the area of the first and second terminal electrodes formed on the first and second surfaces of the main body is excessively large, equivalent series resistance (hereinafter, referred to as 'ESR') may significantly increase.

The multilayer ceramic electronic component may be embedded in or mounted on the printed circuit board to be used. In this case, the multilayer ceramic electronic component may be embedded or mounted by adhering the external electrodes thereof and the electrodes of the printed circuit board to each other using the solder or the like.

In a case of a general multilayer ceramic electronic component, external electrodes may be formed by applying a conductive paste on external surfaces of a main body. Since the external electrodes have a convex shape, the multilayer ceramic electronic component and the printed circuit board may not be stably adhered to each other. For example, a large number of voids may be formed between the external electrodes of the multilayer ceramic electronic component and the electrodes of the printed circuit board, and the adhesive material such as the solder, or the like, may not be sufficiently provided in the voids, and thus, adhesion between the multilayer ceramic electronic component and the printed circuit board may be rendered unstable. Further, since an external shape of the multilayer ceramic electronic component includes the convex shape, it is difficult to stably dispose the multilayer ceramic electronic component on the printed circuit board.

In the multilayer ceramic electronic component 100 according to the exemplary embodiment, since the first external electrode 120a includes the first base electrode 121a and the first terminal electrode 122a disposed on the portion of the first base electrode 121a formed as the edge portion of the first surface of the main body 110, and the second external electrode 120b includes the second base electrode 121b and the second terminal electrode 122b disposed on the portion of the second base electrode 121b formed as the edge portion of the second surface of the main body 110, the convex shapes of the first and second electrodes 121a and 121b may be alleviated by the first and second terminal electrodes 122a and 122b. Therefore, the first and second external electrodes 120a and 120b may have a shape advantageous for mounting. Further, ESR characteristics may be improved by adjusting the disposition and shape of the first and second terminal electrodes 122a and 122b.

Figure 4:
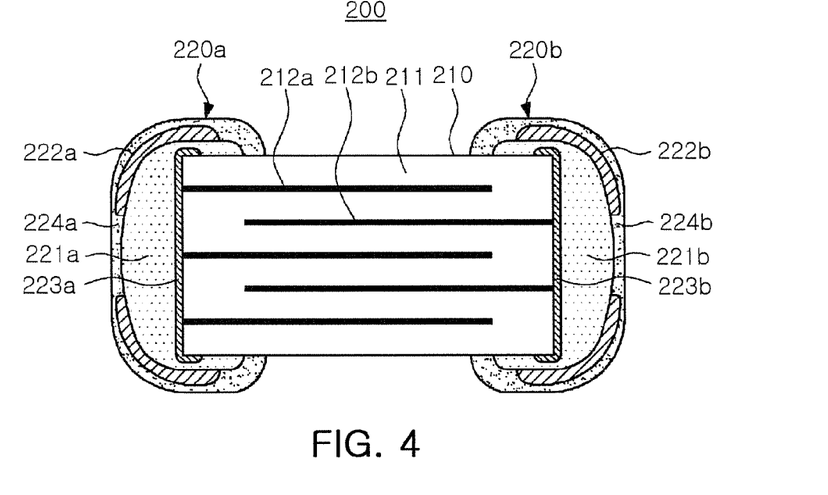
FIG. 4 is a cross-sectional view of a multilayer ceramic electronic component according to another exemplary embodiment in the present disclosure.

FIG. 4 is a cross-sectional view of a multilayer ceramic electronic component 200 according to another exemplary embodiment.

Referring to FIG. 4, first and second external electrodes 220a and 220b of a multilayer ceramic electronic component 200 according to another exemplary embodiment may further include conductive electrodes on at least one surface of first and second base electrodes 221a and 221b and on at least one surface of first and second terminal electrodes 222a and 222b.

Referring to FIG. 4, the first external electrode 220a may further include a conductive electrode 224a disposed on the first terminal electrode 222a, and the second external electrode 220b may include a conductive electrode 224b disposed on the second terminal electrode 222b. Further, the first external electrode 220a may include a conductive electrode 223a disposed between a first surface of a main body 210 and the first base electrodes 221a, and the second external electrode 220b may include a conductive electrode 223b disposed between a second surface of the main body 210 and the second base electrode 221b.

Since FIG. 4 illustrates an exemplary embodiment, the conductive electrodes are not limited thereto. The conductive electrodes may only be formed in portions of the first and second external electrodes 220a and 220b.

The conductive electrodes 223a and 223b formed between the first surface of the main body 210 and the first base electrode 221a and the second surface of the main body 210 and the second base electrode 221b may include a conductive metal, for example, one of silver (Ag), lead (Pb), platinum (Pt), nickel (Ni), and copper (Cu), alloys thereof, or the like. However, a material of the conductive electrodes is not limited thereto.

The conductive electrodes 224a and 224b disposed on the first and second terminal electrodes 222a and 222b may be plating layers containing nickel (Ni) or tin (Sn). The plating layers increase adhesion strength between an electronic component and a printed circuit board at the time of mounting the electronic component on the printed circuit board, or the like, by soldering. As a plating method, a method known in the art may be used, and a lead-free plating method may be considered as being environmental friendliness. However, the plating method is not limited thereto.

Figure 5:
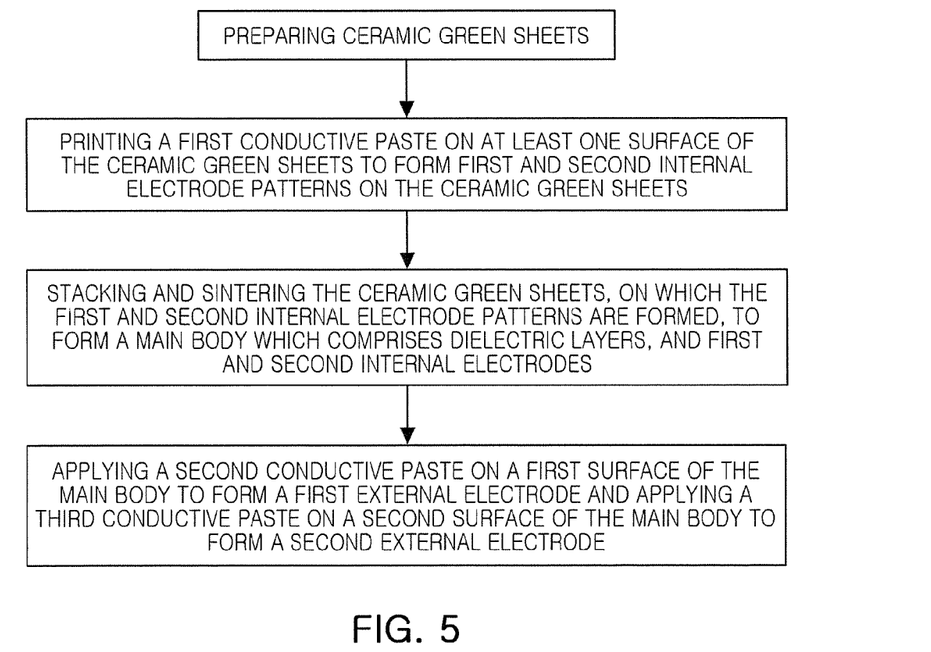
FIG. 5 is a flowchart of to show a manufacturing process of the multilayer ceramic electronic component.

FIG. 5 is a flow chart of to show a manufacturing process of the multilayer ceramic electronic component.

FIGS. 6A through 6F are views illustrating a manufacturing method of a multilayer ceramic electronic component 100 according to an exemplary embodiment.

Referring to FIGS. 5 and 6A through 6F, the manufacturing method of a multilayer ceramic electronic component 100 according to the exemplary embodiment may include: preparing ceramic green sheets 11; forming first and second internal electrode patterns 12a and 12b on the ceramic green sheets 11; forming a main body 110 including dielectric layers 111, and first and second internal electrodes 112a and 112b by stacking and sintering the ceramic green sheets 11 on which the first and second internal electrode patterns 12a or 12b are formed; and forming a first external electrode 120a on a first surface of the main body 110 to be electrically connected to the first internal electrodes 112a and forming a second external electrode 120b on a second surface of the main body 110 to be electrically connected to the second internal electrodes 112b.

In addition, the forming of the first external electrode 120a may include forming a first base electrode 121a and forming a first terminal electrode 122a disposed on a portion of the first base electrode 121a forming an edge portion of the first surface of the main body 110, and the forming of the second external electrode 120b may include forming a second base electrode 121b and forming a second terminal electrode 122b disposed on a portion of the second base electrode 121b forming an edge portion of the second surface of the main body 110.

Figure 6A:
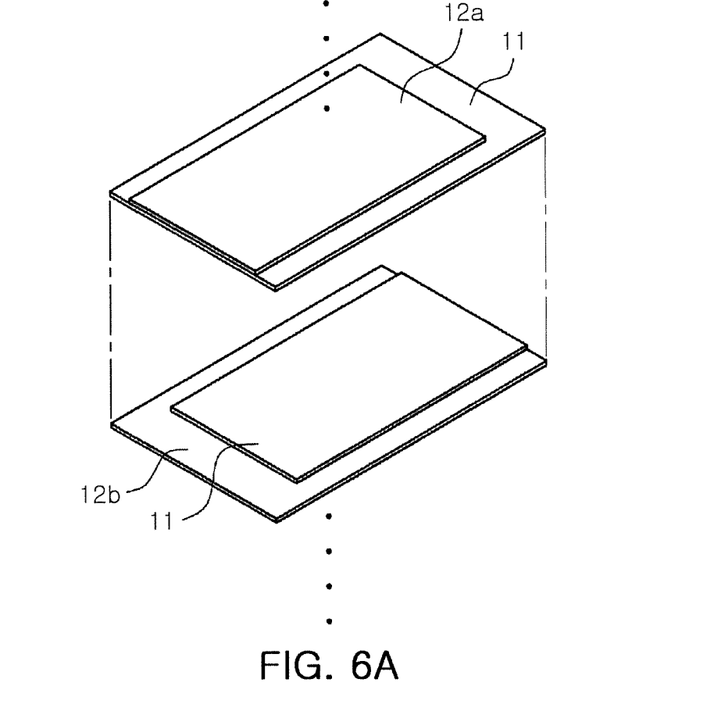
FIGS. 6A through 6F are views illustrating a manufacturing method of a multilayer ceramic electronic component according to an exemplary embodiment in the present disclosure.

FIG. 6A illustrates the preparing of the ceramic green sheets 11 and the forming of the first and second internal electrode patterns 12a and 12b on the ceramic green sheets 11.

The ceramic green sheets 11, which form the dielectric layers 111 of the main body 110, may be manufactured in a sheet shape having a thickness of several µm by mixing ceramic powder, a polymer, a solvent, and the like, to prepare a slurry, applying the prepared slurry to a carrier film using a doctor blade method or the like, and drying the applied slurry.

Next, the first and second internal electrode patterns 12a and 12b may be formed by printing a conductive paste on at least one surface of the ceramic green sheets 11 to a predetermined thickness. In this case, the first and second internal electrode patterns 12a and 12b may be exposed to left and right side surfaces of the ceramic green sheets 11, respectively. As a printing method of the conductive paste, a screen printing method, a gravure printing method, or the like, may be used, but the printing method is not limited thereto.

Figure 6B:
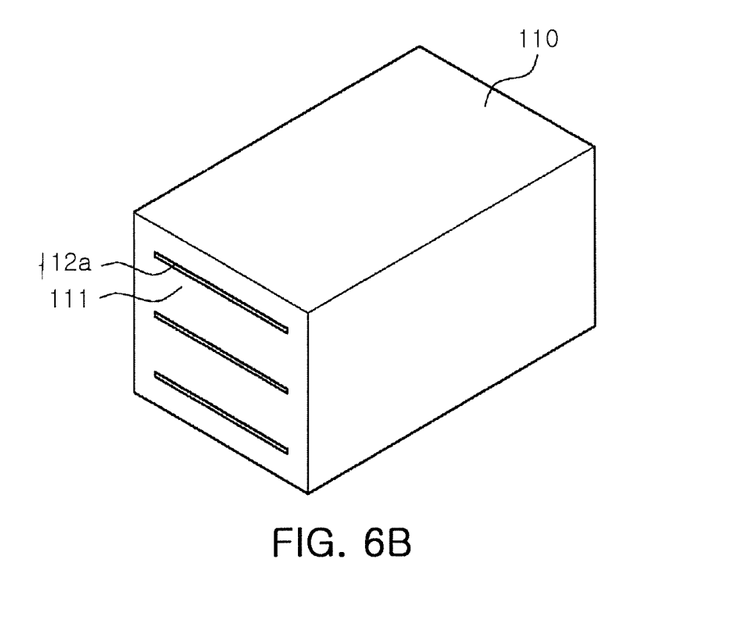

FIG. 6B illustrates the forming of the main body 110 including the dielectric layers 111 and the first and second internal electrodes 112a and 112b by stacking and sintering the ceramic green sheets 11 on which the first and second internal electrode patterns 12a or 12b is formed.

A multilayer body may be prepared by stacking a plurality of ceramic green sheets on which the first and second internal electrode patterns 12a and 12b is formed and pressing the stacked ceramic green sheets 11 in a width direction.

Thereafter, the multilayer body may be cut into portions corresponding to single multilayer ceramic electronic components 100 to thereby have chip form, followed by sintering at a high temperature. Therefore, the main body 110 may be formed. In this case, the main body 110 may be formed by stacking the dielectric layers 111 and the first and second internal electrodes 112a and 112b, wherein the first internal electrodes 112a may be exposed externally through a first surface of the main body 110, and the second internal electrodes 112b may be exposed externally through a second surface of the main body 110.

Figure 6C:
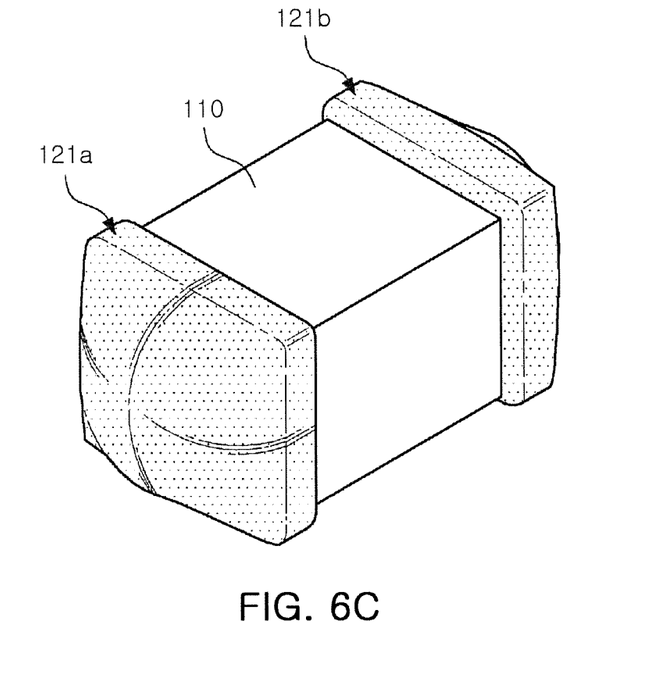
Figure 6D:
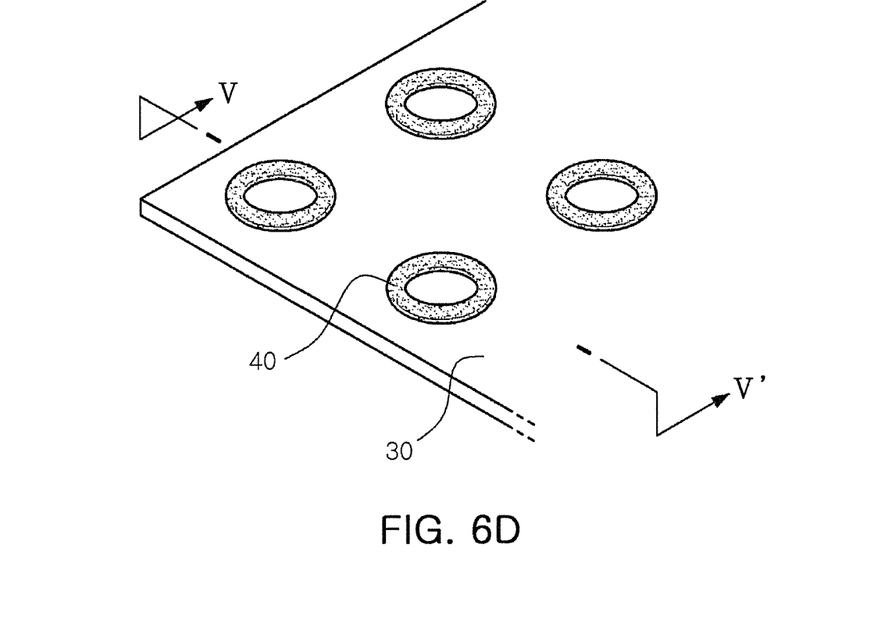
Figure 6E:
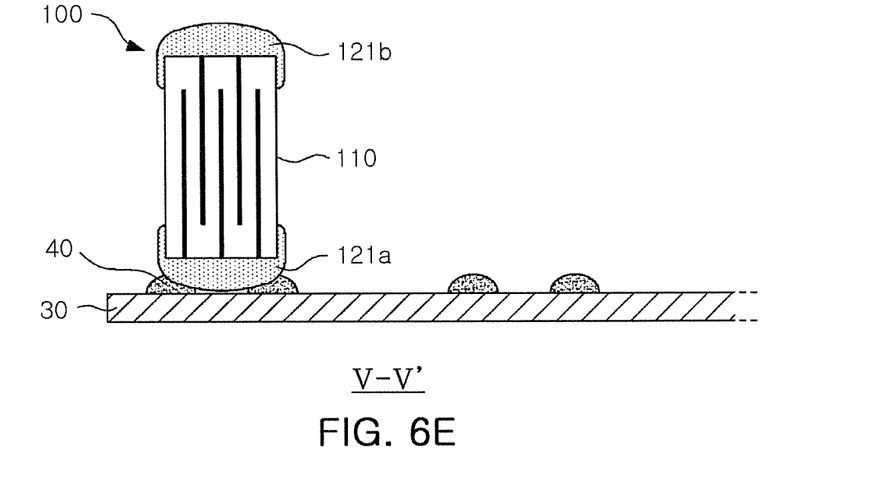

FIGS. 6C through 6E illustrate the forming of the first and second external electrodes 120a and 120b. The first external electrode 120a may include the first base electrode 121a and the first terminal electrode 122a disposed on the first base electrode 121a, and the second external electrode 120b may include the second base electrode 121b and the second terminal electrode 122b disposed on the second base electrode 121b.

FIG. 6C illustrates the forming of the first and second base electrodes 121a and 121b. The first and second base electrodes 121a and 121b may be formed on both end surfaces of the main body 110 to cover the first and second internal electrodes 112a and 112b to thereby be electrically connected to the first and second internal electrodes 112a and 112b, respectively.

Central portions of the first and second base electrodes 121a and 121b on the first and second surfaces of the main body 110 may have a convex shape.

The first and second base electrodes 121a and 121b may contain a conductive metal, for example, at least one of silver (Ag), lead (Pb), platinum (Pt), nickel (Ni), and copper (Cu), alloys thereof, or the like. However, a material of the first and second base electrodes 121a and 121b is not limited thereto. The first and second base electrodes 121a and 121b may be formed by dipping the first and second surfaces of the main body 110 in a conductive paste.

FIGS. 6D and 6E illustrate the forming of the first and second terminal electrodes 122a and 122b. Referring to FIGS. 6D and 6E, the forming of the first and second terminal electrodes 122a and 122b may include printing a conductive paste 40 on a pad 30, forming the first terminal electrode 122a by contacting the first surface of the main body 110 on which the first base electrode 121a is formed with the conductive paste 40 printed on the pad 30, and forming the second terminal electrode 122b by contacting the second surface of the main body 110 on which the second base electrode 121b is formed with the conductive paste 40 printed on the pad 30. Here, the sequence of forming the first and second terminal electrodes 122a and 122b is not limited.

FIG. 6D illustrates the pad 30 and the conductive paste 40 applied to the pad 30 to form the first and second terminal electrodes 122a and 122b.

Referring to FIG. 6D, the pad 30 is not particularly limited, but may include rubber, stainless steel, or the like. The conductive paste 40 containing a resin may be applied to the pad 30 using a screen printing method, or the like. The conductive paste 40 may contain one of silver (Ag), lead (Pb), platinum (Pt), nickel (Ni), and copper (Cu), or alloys thereof, as a conductive material, and an epoxy as the resin.

The conductive paste 40 may be printed on the pad 30 in a polygonal shape such as a circular shape, a quadrangular shape, or the like, of which a central portion is empty.

FIG. 6E illustrates the forming of the first and second terminal electrodes 122a and 122b by contacting the main body 110 on which the first and second base electrodes 121a and 121b are formed with the conductive paste 40 printed on the pad 30.

Since the central portion of the conductive paste 40 is empty, the first terminal electrode 122a may not be formed in a central portion of the first base electrode 121a disposed on the first surface of the main body 110, and the second terminal electrode 122b may not be formed in a central portion of the second base electrode 121b disposed on the second surface of the main body 110.

Figure 6F:
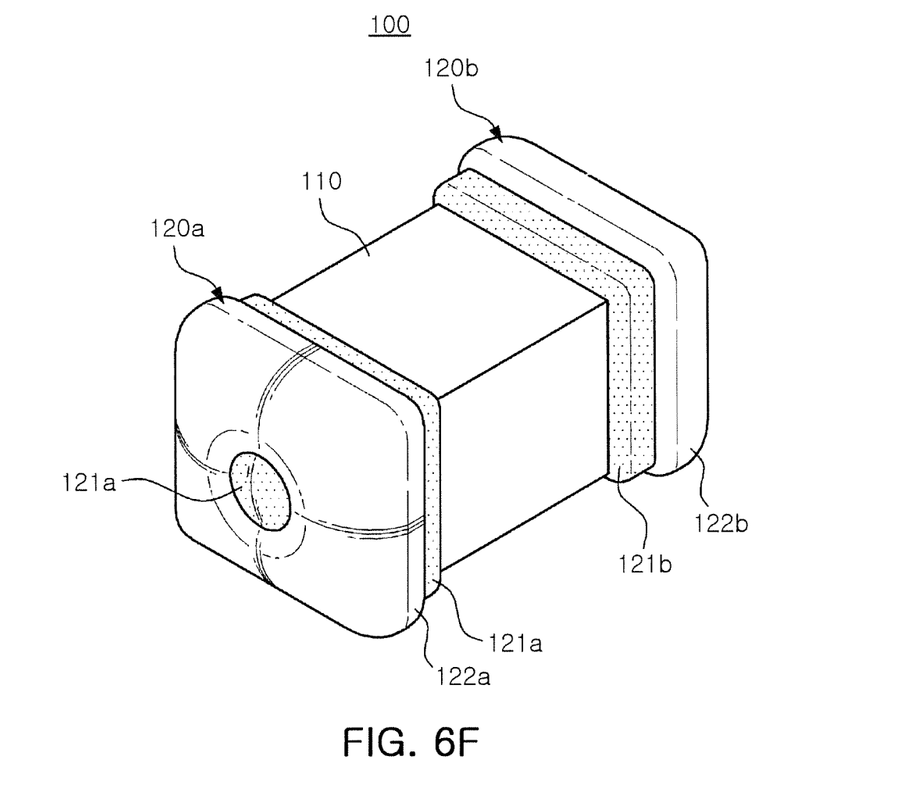

FIG. 6F illustrates a multilayer ceramic electronic component 100 manufactured by the above-mentioned method.

Referring to FIG. 6F, in the multilayer ceramic electronic component 100 manufactured according to the exemplary embodiment, the first and second terminal electrodes 122a and 122b may be toroidal, the first terminal electrode 122a may not be disposed in the central portion of the first base electrode 121a disposed on the first surface of the main body 110, and the second terminal electrode 122b may not be disposed in the central portion of the second base electrode 121b disposed on the second surface of the main body 110.

Further, in the forming of the first base electrode 121a and the forming of the second base electrode 121b, the first and second base electrodes 121a and 121b may be formed so that a portion of the first or second base electrode 121a or 121b exposed to the first or second surface of the main body 110 are thicker than a portion of the first or second base electrode 121a or 121b covered by the first or second terminal electrode 122a or 122b.

Further, in the forming of the first terminal electrode 122a and the forming of the second terminal electrode 122b, when a thickness of the first or second base electrode 121a or 121b in the center of the first or second surface of the main body 110 is defined as A, and a thickness of the first or second external electrode 120a or 120b at an end portion of the first or second terminal electrode 122a or 122b disposed on the first or second surface of the main body 110 is defined as A', A'/A may satisfy $0.7 \leq A'/A \leq 1.2$.

In addition, in the forming of the first base electrode 121a and the forming of the second base electrode 121b, the first base electrode 121a may extend from the first surface of the main body 110 to the third, fourth, fifth, or sixth surface thereof, and the second base electrode 121b may extend from the second surface of the main body 110 to the third, fourth, fifth, or sixth surface thereof. Further, in the forming of the first terminal electrode 122a and the forming of the second terminal electrode 122b, the first terminal electrode 122a may extend to be disposed on the first base electrode 121a, which extends to be disposed on the third, fourth, fifth, or sixth surface of the main body 110, the second terminal electrode 122b may extend to be disposed on the second base electrode 121b, which extends to be disposed on the third, fourth, fifth, or sixth surface of the main body 110. When a length from the first or second surface of the main body 110 to a portion of the first or second base electrode 121a or 121b extended from the first or second surface of the main body 110 to the third, fourth, fifth, or sixth surface thereof is defined as B, and a length from the first or second surface of the main body 110 to a portion of the first or second terminal electrode 122a or 122b, which extends from the first or second surface of the main body 110 to the third, fourth, fifth, or sixth surface thereof, is defined as B', B'/B may satisfy $0.8 \leq B'/B \leq 1$.

Further, in the forming of the first terminal electrode 122a and the forming of the second terminal electrode 122b, when the main body 110 is viewed from the first or second surface of the main body 110, an area of the first or second surface of the main body 110 is defined as C, and an area of the first or second terminal electrode 122a or 122b disposed on the first or second surface of the main body 110 is defined as C', C'/C may satisfy 0.4≤C'/C≤0.7.

INVENTIVE EXAMPLE

The following Tables 1 to 3 illustrate results obtained by evaluating mounting stability, ESR characteristics, reliability, and moisture resistance of multilayer ceramic electronic components according to the exemplary embodiment.

The multilayer ceramic electronic components used in the evaluation of Tables 1 to 3 were multilayer ceramic capacitors having a 1005 size, the number of stacked dielectric layers was 360, base electrodes were formed using a conductive paste containing Cu, and terminal electrodes were formed using a conductive paste containing Cu powder and an epoxy resin.

Table 1 illustrates results of evaluating mounting stability and the presence or absence of exterior defects of respective multilayer ceramic capacitors according to a central thickness A of the base electrode and a thickness A' of the base electrode and the terminal electrode at an end portion of the terminal electrode.

Mounting stability was evaluated by soldering evaluation, and the exterior defect was evaluated by inspecting an exterior of respective multilayer ceramic capacitors and disposition of the base electrode and the terminal electrode thereof.

TABLE 1

|  | A'/A | Mounting Stability | Exterior Defect |
|---|---|---|---|
| Comparative Example 1 | 1.5 | B | B |
| Comparative Example 2 | 1.4 | B | B |
| Comparative Example 3 | 1.3 | A | B |
| Inventive Example 1 | 1.2 | G | G |
| Inventive Example 2 | 1.1 | G | G |
| Inventive Example 3 | 1.0 | G | G |
| Inventive Example 4 | 0.9 | G | G |
| Inventive Example 5 | 0.8 | G | G |
| Comparative Example 4 | 0.7 | A | G |
| Comparative Example 5 | 0.6 | B | G |
| Comparative Example 6 | 0.5 | B | G |

B: Bad
A: Acceptable
G: Good

Referring to Table 1, it may be appreciated that when A'/A satisfied 0.7≤A'/A≤1.2, the mounting stability was evaluated as A or G, and the exterior defect was evaluated as G, and thus, the multilayer ceramic capacitor may be used. Further, it may be appreciated that when A'/A satisfied 0.8≤A'/A≤1.2, both of the mounting stability and the exterior defect were evaluated as G.

Table 2 illustrates results of evaluating mounting stability and reliability by observing whether or not a crack was generated in each of multilayer ceramic capacitors and whether or not the terminal electrode was delaminated, according to a length B of the base electrode extended to the third to sixth surfaces of the main body and a length B' of the terminal electrode extended to the third to sixth surfaces of the main body.

Whether or not cracks were generated in the multilayer ceramic capacitor was measured by cutting the multilayer ceramic capacitor, and observing an internal portion thereof, and whether or not the terminal electrode was delaminated was determined by observing an exterior of the multilayer ceramic capacitor.

TABLE 2

|  | B'/B | Crack Generation (The number of Samples Having Cracks/The Entire Number of Samples) | Delamination of Terminal Electrode |
|---|---|---|---|
| Comparative Example 7 | 0.5 | 26/100 | Not delaminated |
| Comparative Example 8 | 0.6 | 11/100 | Not delaminated |
| Comparative Example 9 | 0.7 | 3/100 | Not delaminated |
| Inventive Example 6 | 0.8 | 0/100 | Not delaminated |
| Inventive Example 7 | 0.9 | 0/100 | Not delaminated |
| Inventive Example 8 | 1.0 | 0/100 | Not delaminated |
| Comparative Example 10 | 1.1 | 0/100 | Delaminated |
| Comparative Example 11 | 1.2 | 0/100 | Delaminated |

Referring to Table 2, it may be appreciated that when B'/B satisfied 0.8≤B'/B≤1, cracks were not generated, and the terminal electrode was not delaminated.

Table 3 illustrates results of evaluating ESR characteristics, an accelerated life time, and moisture resistance of respective multilayer ceramic capacitors according to area C of the first or second surface of the main body and an area C' of the terminal electrode disposed on the first and second surface of the main body.

The accelerated life time was evaluated under conditions of 2 Vr and 3 hr, and thus, reliability of the multilayer ceramic electronic component was evaluated. In addition, moisture resistance was evaluated under conditions of 85%, 85° C., 2 Vr, and 3 hr.

TABLE 3

|  | C'/C | ESR (mΩ) | Accelerated Life Time | Moisture Resistance |
|---|---|---|---|---|
| Comparative Example 12 | 1 | 35 | G | G |
| Comparative Example 13 | 0.9 | 34 | G | G |
| Comparative Example 14 | 0.8 | 31 | G | G |
| Inventive Example 9 | 0.7 | 20 | G | G |
| Inventive Example 10 | 0.6 | 19 | G | G |
| Inventive Example 11 | 0.5 | 16 | G | G |
| Inventive Example 12 | 0.4 | 14 | G | G |
| Comparative Example 15 | 0.3 | 13 | G | B |
| Comparative Example 16 | 0.2 | 9 | G | B |
| Comparative | 0.1 | 7 | B | B |

TABLE 3-continued

|  | C'/C | ESR (mΩ) | Accelerated Life Time | Moisture Resistance |
|---|---|---|---|---|
| Example 17 Comparative Example 18 | 0 | 5 | B | B |

B: Bad
G: Good

Referring to Table 3, it may be appreciated that when C'/C satisfied 0.4≤C'/C≤0.7, ESR was measured to be 20 mΩ or less, and the accelerated life time and moisture resistance were evaluated as G.

As set forth above, according to exemplary embodiments, in the multilayer ceramic electronic component and the manufacturing method thereof, mounting stability, ESR characteristics, reliability, and moisture resistance may be improved.

While exemplary embodiments have been shown and described above, it will be apparent to those skilled in the art that modifications and variations could be made without departing from the scope of the present invention as defined by the appended claims.

What is claimed is:

1. A multilayer ceramic electronic component comprising:
a main body in which dielectric layers and first and second internal electrodes are stacked in a thickness direction of the main body; and
a first external electrode disposed on a first surface of the main body and a second external electrode disposed on a second surface of the main body,
wherein the first internal electrodes are exposed to the first surface of the main body and connected to the first external electrode,
the second internal electrodes are exposed to the second surface of the main body and connected to the second external electrode,
the first external electrodes include
a first base electrode forming a first edge portion of the first surface of the main body and
a first terminal electrode disposed on a portion of the first base electrode and having a hole exposing a central portion of the first base electrode, and
the second external electrodes include
a second base electrode forming a second edge portion of the second surface of the main body and
a second terminal electrode disposed on a portion of the second base electrode and having a hole exposing a central portion of the second base electrode.

2. The multilayer ceramic electronic component of claim 1, wherein the first terminal electrode is disposed on the first base electrode except a central portion of the first base electrode which is disposed on the first surface of the main body, and the second terminal electrode is disposed on the second base electrode except a central portion of the second base electrode which is disposed on the second surface of the main body.

3. The multilayer ceramic electronic component of claim 1, wherein the main body includes the first surface to which the first external electrode is disposed, the second surface to which the second external electrode is disposed, and third to sixth surfaces perpendicular to the first and second surfaces and parallel to each other,
the first terminal electrode is disposed on a portion of the first base electrode which encloses edges of the main body between the first surface of the main body and the third, fourth, fifth, and sixth surfaces thereof, and
the second terminal electrode is disposed on a portion of the second base electrode which encloses edges of the main body between the second surface of the main body and the third, fourth, fifth, and sixth surfaces thereof.

4. The multilayer ceramic electronic component of claim 1, wherein the first terminal electrode and the second terminal electrode are toroidal.

5. The multilayer ceramic electronic component of claim 1, wherein the first terminal electrode and the second terminal electrode contain a resin and a conductive material.

6. The multilayer ceramic electronic component of claim 1, wherein when a thickness of the first or second base electrode from a center of the first or second surface of the main body to a center of the first or second base electrode in a length direction of the body is defined as A, and a thickness of the first or second external electrode from the first or second surface of the main body to the most outer surface of the first terminal electrode or the second terminal electrode is defined as A', A'/A satisfies 0.7≤A'/A≤1.2.

7. The multilayer ceramic electronic component of claim 1, wherein the first base electrode extends from the first surface of the main body toward the second surface of the main body in a length direction of the body to be in contact with third, fourth, fifth, or sixth surface of the main body, the first terminal electrode extends in the length direction of the body to be disposed on the extended portion of the first base electrode, the second base electrode extends from the second surface of the main body toward the first surface of the main body in the length direction of the body to be in contact with the third, fourth, fifth, or sixth surface of the main body, and the second terminal electrode extends in the length direction of the body to be disposed on the extended portion of the second base electrode, and
when a length from the first or second surface of the main body to the extended portion of the first or second base electrode, which extends from the first or second surface of the main body to the third, fourth, fifth, or sixth surface thereof in the length direction of the body is defined as B, and a length from the first or second surface of the main body to the extended portion of the first terminal electrode or the second terminal electrode, which extends from the first or second surface of the main body to the third, fourth, fifth, or sixth surface thereof in the length direction of the body, is defined as B', B'/B satisfies 0.8≤B'/B≤1.

8. The multilayer ceramic electronic component of claim 7, wherein the first external electrode includes a first conductive electrode disposed between the first surface of the main body and the first base electrodes, and
the second external electrode includes a second conductive electrode disposed between the second surface of the main body and the second base electrode.

9. The multilayer ceramic electronic component of claim 8, wherein the first conductive electrode extends from the first surface of the body toward the second surface in the length direction of the body to be in contact with third, fourth, fifth, and sixth surfaces of the body, and
the second conductive electrode extends from the second surface of the body toward the first surface in the length direction of the body to be in contact with the third, fourth, fifth, and sixth surfaces of the body.

10. The multilayer ceramic electronic component of claim 7, wherein the first external electrode includes a third conductive electrode covering the first terminal electrode and the first base electrode, and the second external electrode may include a fourth conductive electrode covering the second terminal electrode and the second base electrode.

11. The multilayer ceramic electronic component of claim 10, wherein the third conductive electrode extends in the length direction of the body to cover the extended portions of the first terminal electrode and the first base electrode and to be in contact with third, fourth, fifth, and sixth surfaces of the body, and the fourth conductive electrode extends in the length direction of the body to cover the extended portions of the second terminal electrode and the second base electrode and to be in contact with the third, fourth, fifth, and sixth surfaces of the body.

12. The multilayer ceramic electronic component of claim 1, wherein when viewing from the first or second surface of the main body in a thickness-width direction of the body, an area of the first or second surface of the main body is defined as C, and an area of the first terminal electrode or the second terminal electrode disposed on the first or second surface of the main body is defined as C', C'/C satisfies $0.4 \leq C'/C \leq 0.7$.

13. The multilayer ceramic electronic component of claim 1, wherein each of the first and second base electrodes has a thickness thicker at the exposed portions than at portions by the first terminal electrode or the second terminal electrode.

* * * * *